Patented Apr. 24, 1934

1,955,802

UNITED STATES PATENT OFFICE 1,955,802

MANUFACTURE OF AROMATIC ARYLIDES

Richard Frank Goldstein, Sedgley Park, Prestwich, England, assignor to Imperial Chemical Industries Limited, a corporation of Great Britain No Drawing. Application September 10, 1932, Serial No. 632,635. In Great Britain October 10, 1931

4 Claims. (Cl. 260—124)

This invention relates to an improved process for producing aromatic arylamides, and more particularly refers to a process for producing exceptionally pure arylamides of ortho-hydroxy-aromatic-carboxylic acids.

Heretofore in producing arylamides of ortho-hydroxy-aromatic-carboxylic acids it was customary to isolate the arylamides by steam distillation. This method of isolating the arylamides had many disadvantages, chief among which was the partial hydrolysis of the reaction product. Another disadvantage was that the impurities formed during the reaction were not removed by the steam distillation but were left behind as contaminants in the arylamides.

It is an object of the present invention to produce arylamides of ortho-hydroxy-aromatic-carboxylic acids by a much simpler process than was formerly possible. A further object is to produce these arylamides in larger yields and in purer form than heretofore. Additional objects will appear hereinafter.

These objects are attained by the present invention wherein the solution containing the arylamides, produced by the customary processes, is diluted and neutralized, thereafter the insoluble arylamides being isolated by any suitable means.

The invention may be more completely understood by reference to the following illustrative examples, in which the quantities are stated in parts by weight:

Example 1

93 parts of aniline, 185 parts of 2-3-hydroxy-naphthoic acid and 1200 parts of toluene were heated with agitation to 50° C. At this temperature 60 parts of phosphorus trichloride were run in slowly, and the mixture raised to reflux in 2 hours, maintained in this condition for 12 hours, allowed to cool mixed with 2000 parts of cold water and agitated vigorously. Soda ash was then added slowly until the whole was neutral to brilliant yellow paper, when the obtained precipitate was filtered, washed with water until free from toluene and dried. A yield of 2-3-hydroxy-naphthoic anilide of 69% was obtained.

In the above example 138 parts of m-nitroaniline may be substituted for the aniline and the resulting product isolated by filtration in the same manner. After washing free from toluene, the product was further washed with dilute hydrochloric acid to remove the last traces of m-nitroaniline. In this manner a 90% yield of 2-3-hydroxy-naphthoic m-nitroanilide was obtained.

Example 2

138 parts of salicylic acid, 93 parts of aniline and 600 parts of toluene were heated with agitation to 50° C. and 56 parts of phosphorus trichloride run in slowly. The mixture was raised to reflux, and refluxed 8 hours. It was then cooled, mixed with 1000 parts of cold water, agitated vigorously and neutralized to litmus by means of soda ash. The neutral mixture was filtered, washed free from toluene with cold water and dried.

The yield of salicylanilide was 80% of theory.

Example 3

143 parts of a-naphthylamine, 188 parts of 2-3-hydroxy-naphthoic acid and 1000 parts of toluene were warmed to 50° C. at which temperature 55 parts of phosphorus trichloride were added. The mixture was raised to reflux in 4 hours and refluxed gently for 25 hours, then a concentrated solution of 55 parts of soda ash in 200 parts water was added, followed by 2000 parts of cold water. The mixture was agitated until it reacted faintly alkaline to brilliant yellow paper, filtered and the precipitate washed free from toluene with hot water. The precipitate was further washed with dilute hydrochloric acid, to remove the last traces of amine, and dried. A good yield of 2-3-hydroxy-naphthoic-a-naphthylide was thereby obtained.

In carrying out this invention it is to be understood that the above examples are for purposes of illustration only and are not intended as a limitation, since numerous arylamines and ortho-hydroxy-aromatic-carboxylic acids as well as solvents, dehydrating agents and neutralizing agents may be used in place of those previously mentioned. For instance, in place of the arylamines used there might be substituted other amines such as ortho-toluidine, para-chloraniline, ortho-anisidine, para-anisidine, 4-bromo-o-anisidine, 5-chloro-o-toluidine, beta-naphthylamine, 2-5-dimethoxyaniline, 3-chloro-para-phenetidine, and ortho-dianisidine. In place of the ortho-hydroxy-aromatic carboxylic acids mentioned there might be substituted any of the numerous other compounds falling within this group, examples of a few of which are hydroxy-carbazole-carboxylic acid, hydroxy-anthracene-carboxylic acid, and hydroxy-naphtha-carbazole-carboxylic acid, in which the hydroxy and carboxylic acid groups occupy vicinal positions in the aromatic ring. Other dehydrating agents than the phosphorus chlorides may be used, for instance thionyl chlorides or the like.

Instead of producing the arylamide by the reaction of an arylamine and an ortho-hydroxy-aromatic-carboxylic acid it might be produced by any of the other customary reactions, such as the interaction of an aromatic acid halide and an arylamine. Needless to say, the reaction might be carried out in the presence of other solvents, than toluene, and neutralization may be effected by means of an alkaline compound other than soda ash.

It is to be understood that when the reaction product is diluted the water with which it is diluted may have added thereto substances in which the reaction product is substantially insoluble. Also the insoluble arylamide produced thereby may be isolated by any convenient method, such as by passing through a filter press. The isolated arylamide may then be freed of the solvent and any other impurities by washing with water or a dilute acid or by means of any other convenient method.

The arylamides produced by the method described herein are exceptionally pure, since the impurities which are usually present in these arylamides are due to isolation by steam distillation, which is entirely obviated by the present process. The process described is much simpler than those formerly used, since in place of the steam distillation it is necessary merely to neutralize the diluted product and separate the insoluble arylamide therefrom. The product thus separated is in a finely divided form and is much more desirable from a commercial standpoint.

As many apparently widely different embodiments of this invention may be made without departing from the spirit and scope thereof, it is to be understood that I do not limit myself to the specific embodiments thereof except as defined in the appended claims.

I claim:

1. In the process for producing arylamides of o-hydroxy-aromatic-carboxylic acids by interacting an arylamine with an o-hydroxy-aromatic-carboxylic acid in the presence of a solvent and a dehydrating agent selected from the group consisting of phosphorus halides and thionyl halides, the step which comprises adding an alkali to the resulting solution and thereafter filtering said solution.

2. In the process for producing arylamides of o-hydroxy-aromatic-carboxylic acids by interacting members selected from the group consisting of naphthylamine and amino-benzene which may have substituted thereon members selected from the group consisting of alkyl, alkoxy, halogen, and nitro with a compound selected from the group consisting of 2-3-hydroxy-naphthoic acid, salicylic acid, hydroxy-carbazole-carboxylic acid, hydroxy-anthracene-carboxylic acid, and hydroxy-naphthacarbazole-carboxylic acid in the presence of a solvent and a dehydrating agent selected from the group consisting of phosphorus halides and thionyl halides, the step which comprises neutralizing the resulting solution and thereafter filtering said solution.

3. In the process for producing arylamides of o-hydroxy-aromatic-carboxylic acids by interacting amino-benzene which may have substituted thereon members selected from the group consisting of alkyl, alkoxy, halogen, and nitro, with a member selected from the group consisting of 2-3-hydroxy-naphthoic acid and salicylic acid in the presence of a solvent and phosphorus trichloride, the step which comprises diluting and neutralizing the resulting solution and thereafter filtering said solution.

4. In the process for producing arylamides of o-hydroxy-aromatic-carboxylic acids by interacting an amino-benzene which may have substituted thereon members selected from the group consisting of alkyl, alkoxy, halogen and nitro, with 2-3-hydroxy-naphthoic acid in the presence of toluene and phosphorus trichloride, the step which comprises neutralizing, diluting and cooling the resulting solution and thereafter filtering said solution.

RICHARD FRANK GOLDSTEIN.